(12) United States Patent  (10) Patent No.: US 6,483,698 B1
Loh  (45) Date of Patent: Nov. 19, 2002

(54) CRADLE FOR SUPPORTING A PDA AND SIMILAR PORTABLE ELECTRONIC DEVICES

(75) Inventor: Philip Kwok Nan Loh, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/451,199

(22) Filed: Nov. 29, 1999

(30) Foreign Application Priority Data

Nov. 27, 1998 (SG) .......................................... 9805017-2

(51) Int. Cl.⁷ ................................................ G08F 1/16
(52) U.S. Cl. ........................ 361/686; 439/142; 320/113
(58) Field of Search .......................... 361/686, 683; 439/929, 142, 144; 320/107, 113; 429/99, 100

(56) References Cited

U.S. PATENT DOCUMENTS

| | | | | |
|---|---|---|---|---|
| 2,304,870 A | * | 12/1942 | Yost ............................ | 439/142 |
| 5,385,479 A | * | 1/1995 | Okada ......................... | 439/144 |
| 5,411,405 A | * | 5/1995 | McDaniels et al. .......... | 439/131 |
| 5,679,013 A | * | 10/1997 | Matsunaga et al. .......... | 439/144 |
| 5,691,618 A | * | 11/1997 | Kobayashi et al. ............ | 320/2 |
| 5,795,177 A | * | 8/1998 | Hirono ........................ | 439/378 |
| 5,822,183 A | * | 10/1998 | Kanda et al. ................. | 361/684 |
| 5,941,648 A | * | 8/1999 | Robinson et al. .............. | 400/82 |
| 6,045,385 A | * | 4/2000 | Kane ........................... | 439/327 |
| 6,108,200 A | * | 8/2000 | Fullerton .................... | 361/686 |
| 6,127,802 A | * | 10/2000 | Lloyd et al. ................. | 320/113 |
| 6,190,186 B1 | * | 2/2001 | Liao ........................... | 439/144 |

* cited by examiner

Primary Examiner—Brian Sircus
Assistant Examiner—Son V. Nguyen

(57) ABSTRACT

A cradle with a movable back supporting element. The back supporting element extends in one position to support the back of a portable device when the device is received by the cradle. The cradle also includes a supporting region which supports the end of the portable device. When the portable device is not in the cradle, the supporting element can be moved to a position in which it covers the end supporting region.

6 Claims, 6 Drawing Sheets

CRADLE FOR SUPPORTING A PDA AND SIMILAR PORTABLE ELECTRONIC DEVICES

This invention relates to a cradle for receiving and supporting a portable device. Suitably, the portable device is an electronic device, such as a personal digital assistant or a radio telephone.

BACKGROUND OF THE INVENTION

Cradles or docking stations are known for use with portable electronic devices such as cellular telephones and personal digital assistants (PDAs). In general, a cellular telephone cradle receives and supports a cellular telephone in a predetermined upright position. The telephone cradle typically includes charging contacts which electrically couple to corresponding contacts on the telephone for charging a battery of the telephone. A PDA cradle similarly receives and supports a personal digital assistant in a predetermined upright position. The PDA cradle typically includes a data connector which connects with an associated data connector on the PDA for the exchange of electronic information. PDAs are sometimes known as personal organisers.

Typically, the charging contacts and the data connector of a cradle become exposed when the portable electronic device is removed. In this situation, the contacts and the connector are prone to accidental damage which can render the cradle unusable.

FIG. 1 shows a known cradle 10 supporting a personal digital assistant 20. The PDA 20 may, for example, represent the Palm Pilot™ TM PDA available from 3COM Inc., USA. Accordingly, the PDA cradle 10 may represent the corresponding docking station supplied with the Palm Pilot PDA.

The PDA 20 includes features that are common to most PDAs, such as touch screen display 21, a set of user operable keys 22, and a data connector 23 for accessing the central processing unit and memory contained within the housing of the PDA.

The cradle 10 includes a base portion 11 which is designed to sit on a flat surface. The cradle 10 receives and supports the PDA 20 in V-shaped valley which has two supporting surfaces 12 and 13. One supporting surface 12 supports the bottom end of the PDA 20, whilst the other supporting surface 12 supports the back of the PDA 20. The back supporting surface 13 is provided by a planar supporting element 14 which extends upwards at an angle from the base portion 11. The supporting element 14 is strengthened by a triangular strut 15 which joins the base portion 11 and the supporting element 14. The base portion 11, the supporting element 14, and the triangular strut 15 are formed from a single plastics moulding.

The cradle 10 also provides an data interface between the PDA 20 and a personal computer (not shown). The data interface comprises a data connector 16, a synchronising button 17, internal circuitry within the cradle 10, and a data cable 18. When the PDA 20 is placed on the cradle 10, the data connector 16 of the cradle connects to the data connector 23 of the PDA 20 so that electrical signals can be transferred therebetween. These electrical signals, which represent data, are also transferred over the internal circuitry and the data cable 18 to the personal computer (PC). From time-to-time, synchronisation of data between the PC and the PDA 20 can be initiated by a user depressing the synchronisation button 17.

When the PDA 20 is removed from the cradle 10, the data connector 16 is left exposed. There is a risk of damage to the data connector 16 when the cradle is in this exposed state.

SUMMARY OF THE INVENTION

The present invention provides a cradle with a movable back supporting element. The back supporting element extends in one position to support the back of a portable device when the device is received by the cradle. The cradle also includes a supporting region which supports the end of the portable device. When the portable device is not in the cradle, the supporting element can be moved to a position in which it covers the end supporting region.

A cradle in accordance with the invention has the advantage that it can be configured for receiving and supporting a portable device when the back supporting element is extended, and can provide a more compact configuration when the back supporting element covers the end supporting element. The compact configuration makes the cradle more portable for transporting by a user.

Ideally, the cradle is designed for receiving a portable electronic device, such as a personal digital assistant (PDA) or a radio telephone. Suitably, the cradle includes a connector on the end supporting region. Preferably, the cradle includes electrical contacts in the end supporting region for coupling to complementary electrical contacts on the portable electronic device when the device is received by the cradle. In an alternative embodiment the cradle could include optical coupling means for coupling to complementary optical coupling means on the portable electronic device. The optical coupling means could, for example, be an infra-red data interface. A cradle of this kind in accordance with the invention has the advantage that when the back-supporting element is moved to a position in which it covers the end-supporting region, the connector, implemented as electrical contacts, optical coupling means, or otherwise, is less exposed. Thus the connector is less likely to become damaged, particularly when it is transported by a user.

The extent and scope of the present invention is defined in the appended Claim to which reference should now be made.

DETAILED DESCRIPTION OF A SPECIFIC EMBODIMENT OF THE INVENTION

Figure 1:
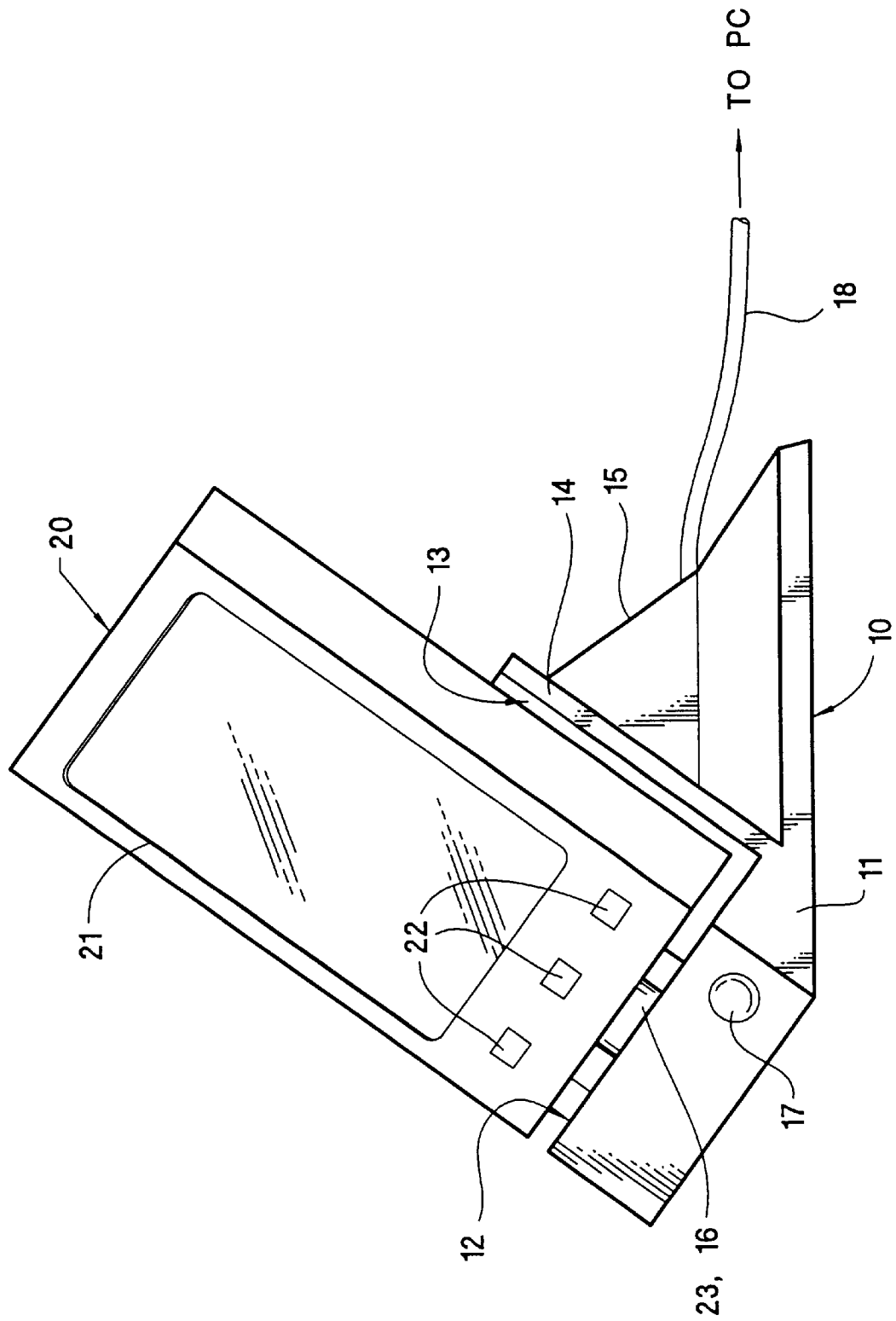
FIG. 1 is a perspective view of a known cradle supporting a personal digital assistant.

An embodiment of the invention will now be described, by way of example, with reference to the accompanying drawings. Various elements of the known cradle and PDA described earlier exist in the cradle and PDA described below. Accordingly, the elements in the following description have been given the same reference numerals. However, as is apparent from the following description, some of the elements have been modified in accordance with the invention.

Referring to FIGS. 2 to 6, there is shown a cradle 10 which can receive and support a personal organiser or digital assistant (PDA) 20. The cradle comprises a base housing 11 and a flap element 14 both made, for example, of a plastics material, and a data connector 16 and charging contacts 16. The charging contacts are supplied with electrical power from a removable power cable 19. A removable data cable 18 couples the data connector to a personal computer.

The flap element 14 is coupled to the base 11 by means of a hinge 30, for example a snap-fit hinge. The hinge 30 allows the flap element 14 to rotate relative to the base 11 between a closed configuration shown in FIGS. 2 and 4, and an open or extended configuration shown in FIGS. 5 and 6. FIG. 3 shows the flap element 14 in an intermediate configuration between the open and closed configurations. The axis of rotation is indicated by the broken line A—A in FIGS. 2 and 3. Further rotation beyond the extended configuration is prevented by the hinge portions 31 of the flap element abutting the housing 11.

Figure 5:
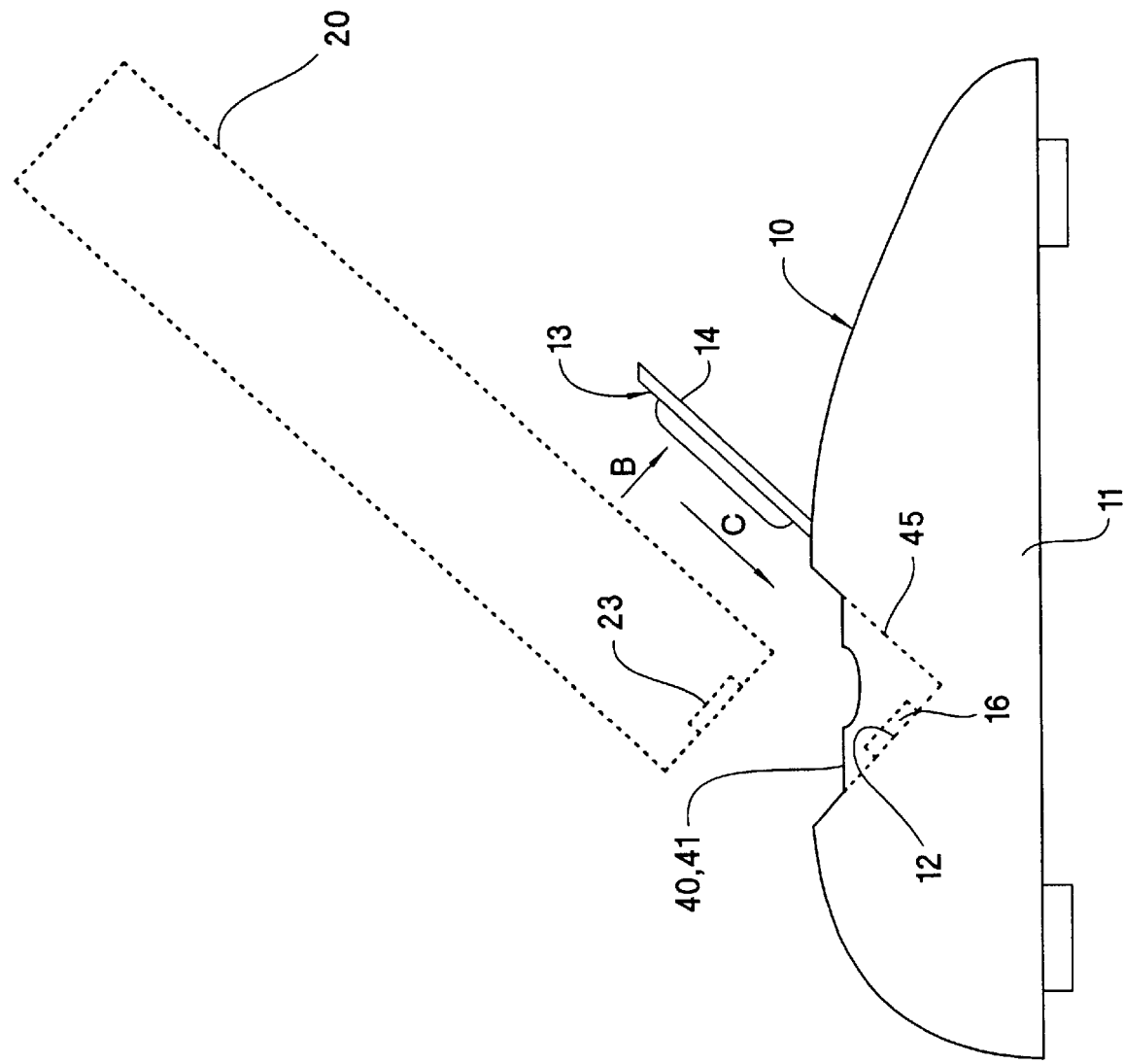
FIG. 5 is a side view of the cradle of FIG. 2 in a fully open configuration together with a personal digital assistant.

With the flap element in the open position, as in FIG. 5, the personal digital assistant 20 is received by the cradle in a V-shaped valley. This valley is formed on one side by a supporting surface 12 of the base 11, and on the other side by a supporting surface 45 of the base 11 and supporting surface 13 of the flap element. The supporting surface 13 may be a plurality of surfaces formed by ribs extending from the flap element. Arrows B and C in FIG. 5 indicate a direction the PDA 20 could be moved in order to be received by the cradle. Side walls 40, 41 are provided at the ends of the V-shaped valley to form a bay which helps further guide the PDA 20 into position in the cradle.

Figure 6:
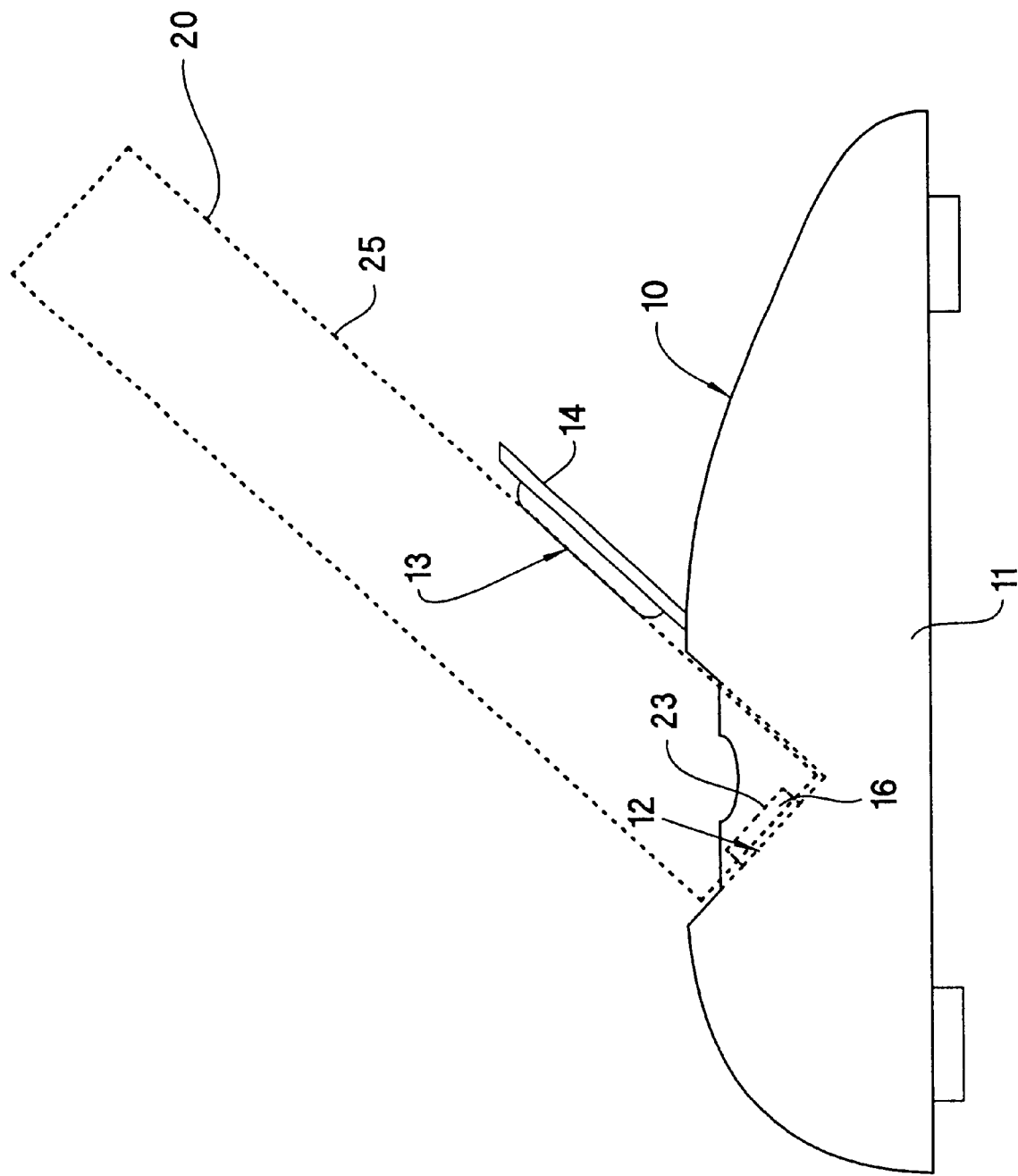
FIG. 6 is a side view similar to FIG. 5 with the personal digital assistant received by the cradle.

FIG. 6 shows the PDA 20 fully received and supported by the cradle in a predetermined supporting position. In this predetermined position, a data connector 23 and charging contacts 23 on the PDA electrically couples with the data connector 16 and charging contacts 16 respectively of the cradle 10. The back surface 25 of the PDA 20 rests against the supporting surface 13 of the flap element 14 and helps to maintain the PDA 20 in an upright position.

Figure 2:
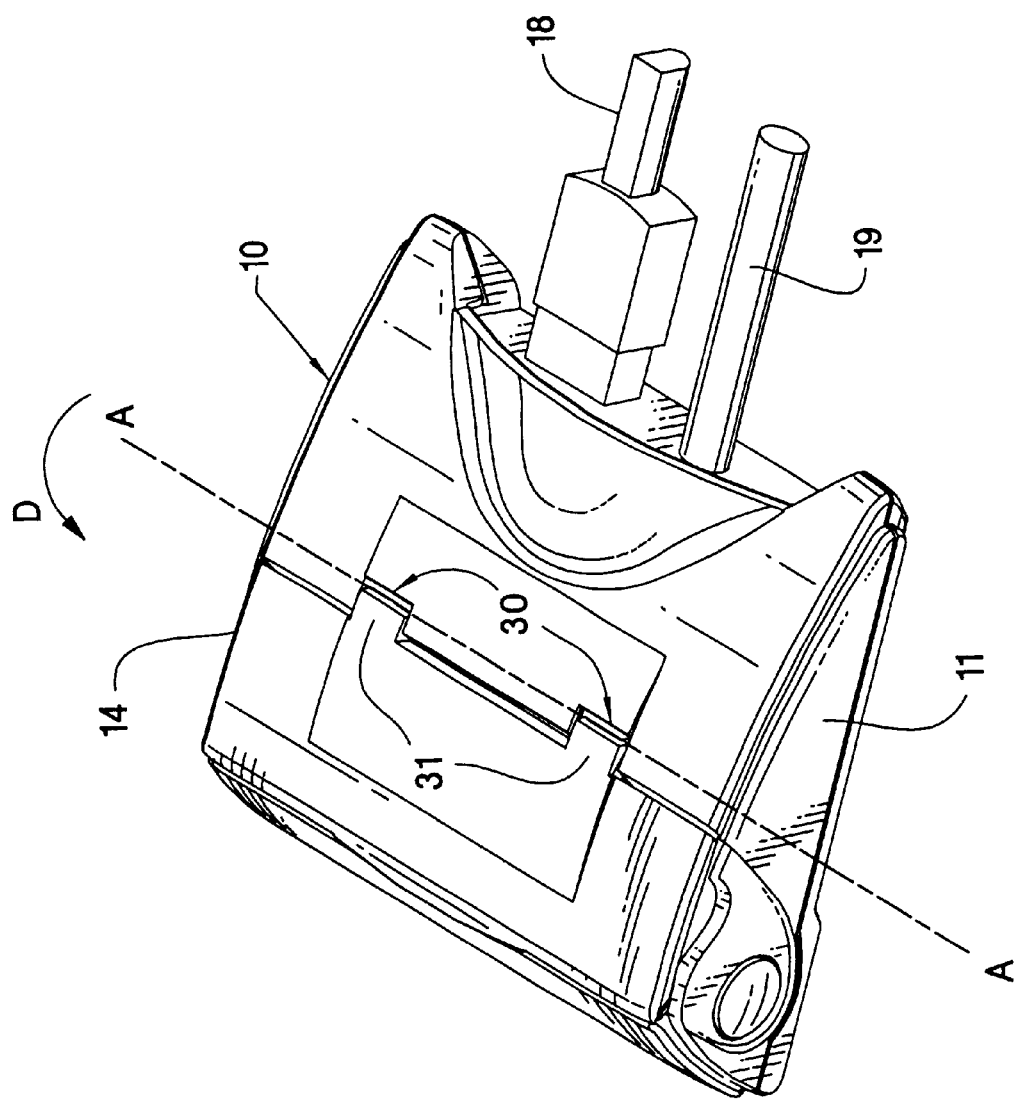
FIG. 2 is a perspective view of a cradle in accordance with the invention in a closed configuration.
Figure 3:
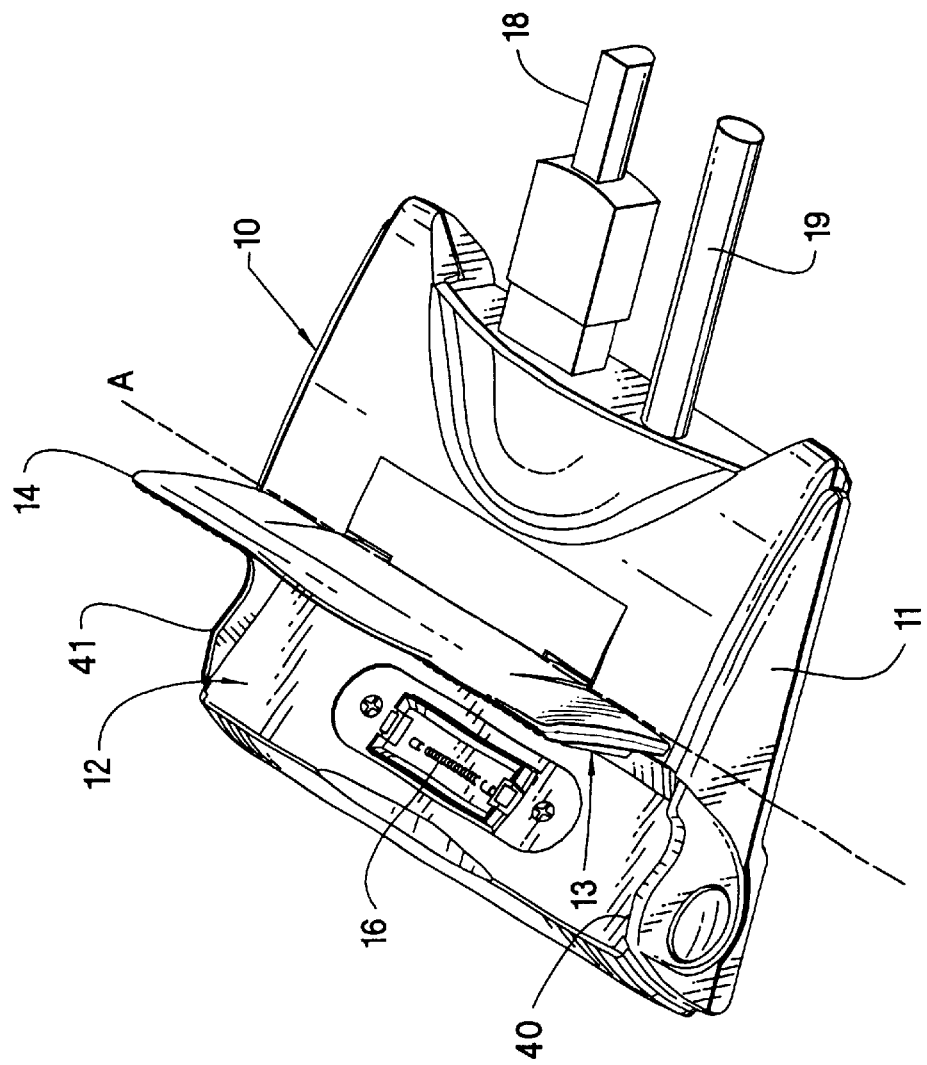
FIG. 3 is a perspective view of the cradle of FIG. 2 in an partially open configuration.
Figure 4:
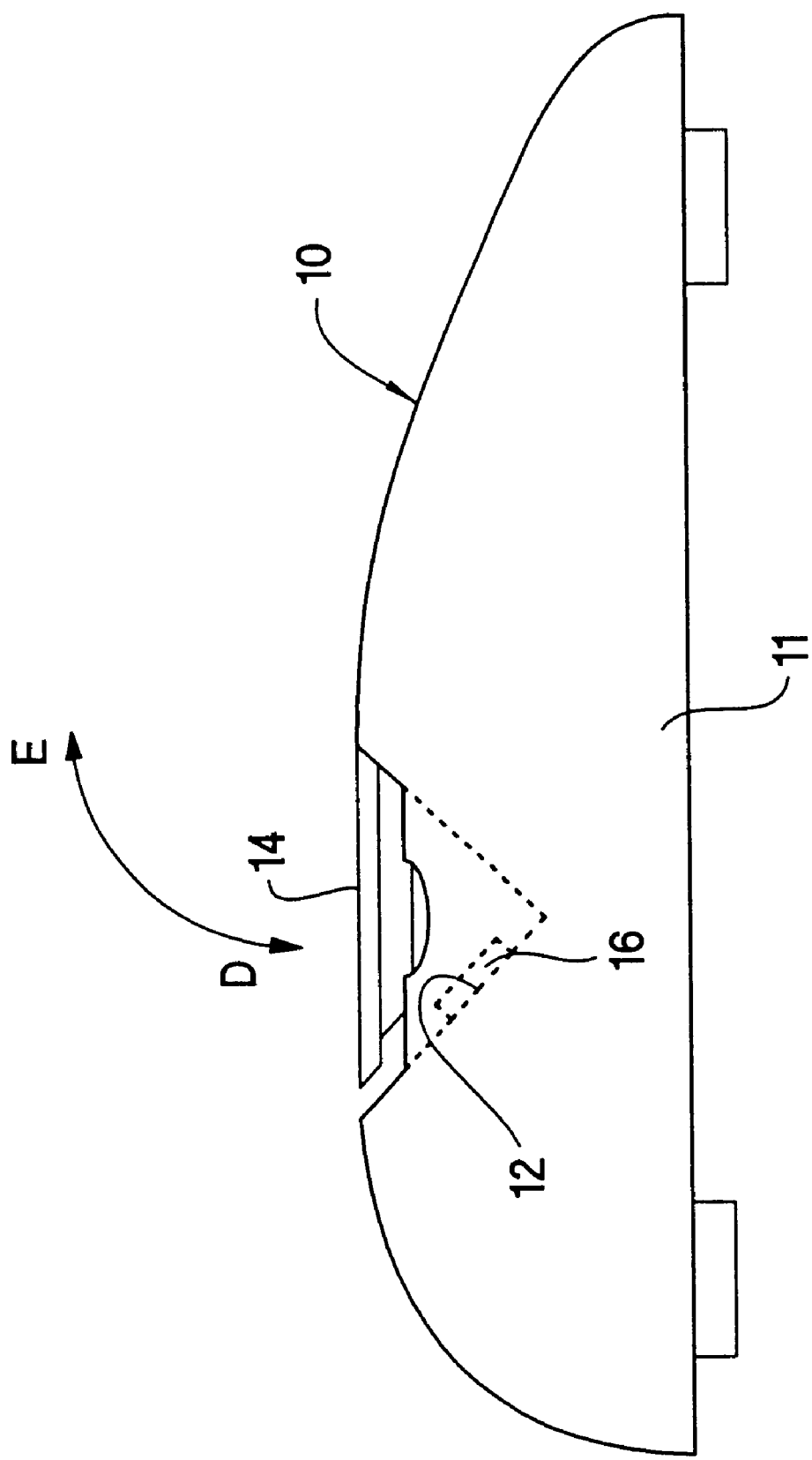
FIG. 4 is a side view of the cradle of FIG. 2.

When the PDA is removed from the cradle 10, the flap element 14 may be rotated to the closed position as indicated by the arrow D in FIGS. 2 and 4. In this closed position, the flap element 14 covers the end supporting surface 12 and more importantly the data connector 16 and charging contacts 16. The flap element 14 seals the V-shaped valley or bay to create a internal cavity in which the data connector 16 and charging contacts 16 are located. The data connector and charging contacts are thus less prone to being accidentally damaged by, for example, a user.

In the closed configuration, the flap element 14 is flush with the housing 11 and the overall dimensions of the cradle are reduced. The cradle also presents a low profile as shown in FIGS. 2 and 4. Therefore, the cradle is more portable and is more likely to fit in, for example, a briefcase when being transported.

When it is desired to place the PDA 20 once more in the cradle, the flap portion is rotated back to the open or extended configuration as indicated by the arrow E in FIG. 4.

What is claimed is:

1. A cradle for receiving and supporting a Personal Digital Assistant (PDA), comprising a base portion having a supporting surface which supports an end surface of the PDA when the PDA is received by the cradle, and a support element hingedly coupled to the base portion and movable between a first predetermined position in which the element supports a first portion of a major surface of the PDA when the PDA is received by the cradle, and a second predetermined position in which the element covers the supporting surface of the base portion, wherein the base portion includes a second supporting surface which supports a second portion of the major surface of the PDA when the PDA is received by the cradle, such second supporting surface being substantially orthogonal to the supporting surface.

2. A cradle as claimed in claim 1, wherein the two supporting surfaces face each other to form a balley for receiving and supporting the PDA.

3. A cradle as claimed in claim 1, wherein the support element in the second predetermined position also covers the second supporting surface of the base portion.

4. A cradle as claimed in claim 1, wherein the cradle includes a housing and the support element in the second predetermined position is flush with the housing.

5. A cradle as claimed in claim 1, wherein the PDA is a data communication device having a data connector on the end surface, and the base portion includes a complementary data connector on the supporting surface for coupling with the data connector of the PDA when the PDA is received by the cradle.

6. A cradle as claimed in claim 1, wherein the PDA is an electrically chargable device having charging contacts on the end surface, and the base portion includes complementary charging contacts on the supporting surface for coupling with the charging contacts of the PDA when the PDA is received by the cradle.

\* \* \* \* \*